United States Patent [19]

Vary et al.

[11] Patent Number: 4,868,810
[45] Date of Patent: Sep. 19, 1989

[54] MULTI-STAGE TRANSMITTER AERIAL COUPLING DEVICE

[75] Inventors: Peter Vary, Herzogenaurach; Ulrich Wellens, Heroldsberg, both of Fed. Rep. of Germany

[73] Assignee: U.S. Philips Corporation, New York, N.Y.

[21] Appl. No.: 83,548

[22] Filed: Aug. 6, 1987

[30] Foreign Application Priority Data

Aug. 8, 1986 [DE] Fed. Rep. of Germany ....... 3626862

[51] Int. Cl.⁴ .............................................. G08C 15/00
[52] U.S. Cl. ..................................................... 370/40
[58] Field of Search ................... 370/37, 38, 40, 69.1, 370/120, 121, 122, 123, 70, 71, 72, 73

[56] References Cited

U.S. PATENT DOCUMENTS

| | | | |
|---|---|---|---|
| 3,742,149 | 6/1973 | Yoshida et al. | 370/69.1 |
| 3,865,990 | 2/1975 | Kuenemund | 370/124 |
| 4,161,694 | 6/1979 | Weber et al. | 370/40 |
| 4,607,362 | 8/1986 | Vary et al. | 370/62 |
| 4,682,361 | 7/1987 | Selbach et al. | 381/46 |
| 4,697,260 | 9/1987 | Grauel et al. | 370/18 |
| 4,700,394 | 10/1987 | Selbach et al. | 381/46 |
| 4,766,562 | 8/1988 | Vary | 364/724.1 |

Primary Examiner—Robert L. Griffin
Assistant Examiner—Wellington Chin
Attorney, Agent, or Firm—Robert J. Kraus

[57] ABSTRACT

Coupling a plurality of transmitters operating with different carrier frequencies to a single aerial is often effected by multiplexing the output signals by means of band-pass filters in the output frequency band. The band-pass filters have one end connected to a start network and from there to the aerial via an aerial transmission line, and the other end to the transmitters via circulators. For an optimal use of the available frequency band, for making less stringent requirements on the band-pass filters and for providing a dynamic channel assignment feature, the transmitter coupler according to the invention has a first stage in the form of a digital coupler and a second stage in which multiplexing is effected, using band-pass filters. The transmitter output signals are combined in the digital coupler, in the pregroup phase, by digital signal processing, preferably using the GTFM method. In the second stage the output signals of the parallel-arranged digital coupler are subjected to a digital-to-analog conversion in the group-phase and to frequency conversion.

9 Claims, 5 Drawing Sheets

MULTI-STAGE TRANSMITTER AERIAL COUPLING DEVICE

BACKGROUND OF THE INVENTION

The invention relates to an arrangement for coupling a plurality of transmitters having different carrier frequencies to an aerial according to the preamble of claims 1 and 2.

In future radio transmission systems having digital or analog speech transmission on the radio transmission path, for example in car phone systems, it must be possible to radiate a very great number of ratio transmission channels from the stationary radio station. In order to radiate as many radio transmission channels as possible from a single aerial, a plurality of high-frequency ratio transmission channels are combined in a transmitter coupler. In DE-PS 28 44 776, corresponding to U.S. Pat. No. 4,211,894, a transmitter coupler is disclosed, comprising a plurality of branches each having a circulator network and a band-pass filter. Multiplexing the output signals of the various transmitters having different carrier frequencies is carried out by the band-pass filters, which have one end connected to a star network and from there to the aerial via an aerial transmission line, and the other end to the transmitters via circulators.

In order to achieve mutual decoupling of the radio transmission channels the individual channel frequencies at a transmitter coupler must be spaced by a multiple of a channel spacing of the system (coupler channel spacing). The maximum number of radio transmission channels connected to a transmitter coupler depends on the permissible insertion loss and the available bandwidth of the radio transmission system. In practice, a power loss of approximately 3 dB can be found when multiplexing. This power loss cons of the loss in the Y circulator of 0.5 dB, the loss in the band-pass filter of approximately 1.5 dB and other losses such as reflexion losses of approximately 1 dB.

Only such a number of radio transmission channels can be simultaneously connected to a transmitter coupler as is the result of the division of the bandwidth of the radio transmission system by the coupler channel spacing. If the coupler channel spacing is reduced the effect of the transmitter coupler is increased, but on the other hand, if there is a greater number of channels the insertion loss of the transmitter coupler will be greater too, increasing the power loss. Reduced insertion losses can be achieved by using band-pass filters having larger dimensions, making the transmitter coupler more expensive and also requiring more space.

The band-pass filters are adjusted to a specific operating frequency and can only work at another operating frequency after they have been adjusted anew. If an increased system capacity can be achieved by dynamic channel assignment, further transmitter coupler inputs can be provided, which are then utilized only occasionally. When this measure is implemented, more space will be required, stiffer demands will be made on the coupler channel spacing and the cost of the transmitter coupler will go up, so that a dynamic channel assignment in radio transmission systems has not been utilized so far.

In DE PS 28 44 776 a hybrid circuit is connected behind the transmitter coupler for switching operations between the various frequency groups, this hybrid circuit operating as a power divider, more specifically, a branching circuit, thus achieving a spreading of the frequency groups over the respective directional aerials.

As the transmitter coupler operates channel selectively in the output frequency range, each individual radio transmission channel has to be amplified accordingly prior to the transmitter coupler. The subject matter of DE PS 28 44 776 does not provide a multiple use of the power amplifiers and integration of the transmitter coupler is not possible either. By using a suitable dielectric, though, the outside dimensions of, for example, an air-filled band-pass filter can be reduced.

From DE-PS 26 39 348, corresponding to U.S. Pat. No. 4,148,038, a circuit arrangement is known for connecting a plurality of mutually decoupled transistors to a single aerial system utilizing four 3 dB couplers. Hybrid circuits are used as 3 dB couplers, that is to say branching circuits in the $\pi/4$ stripline technique, to which the four individual transmitters and the four individual aerials are connected in a specific way. The hybrid circuits have three lines $\pi/4$ in length as well as one line three $\pi/4$ in length. The hybrid circuits equally divide between their two outputs the power received from the transmitters connected to them, and the phase shift in the ring causes the fading waves to be cancelled. In a circuit arrangement known from DE OS 30 04 817, the course indicated by the subject matter of DE PS 26 39 348 is continued and a transmitter coupler in a cascade configuration with phase-shifting circuit components is proposed.

As examinations of the circuit arrangements known from DE-PS 26 39 348 and DE-PS 30 04 817 have shown, they have a high reflexion factor, caused by reflexion to the hybrid circuits or directional couplers, respectively, connected to form the ring or to the aerials. A further disadvantage is the fact that within the reception area there may be zones in which the transmission signal radiated by the aerial is completely cancelled. This can be attributed to the fact that no omnidirectional characteristic can be achieved with the aerial configuration of four directional aerials, in which such cancellations due to reflexion to buildings, trees etc. may occur as a result of the multipath reception. The power loss of such transmitter couplers composed of hybrid circuits or directional couplers, respectively, is due to the order of magnitude of conventional transmitter couplers with a circulatory network and band-pass filter.

The energy radiated by convection in case of a great number of channels and a high packing density has to be eliminated by means of forced cooling. As the band-pass filters are adjusted to the output frequency band, it is impossible to re-arrange channels, for example, for avoiding common-channel interference, so that a manual re-adjustment is always required for a different output frequency.

SUMMARY OF THE INVENTION

It is an object of the invention to provide an arrangement for coupling a plurality of transmitters to a single aerial such that directly adjacent transmitter frequencies can be combined without the need of making stiff requirements on the band-pass filter.

In a first arrangement in accordance with the invention, a plurality of directly adjacent channels preferably in the baseband are combined in the first stage and the groups of channels constituted thus are multiplexed by means of band-pass filters in the second stage. The first stage of the transmitter coupler is arranged as a digital coupler in which in addition to multiplexing also the modulation of the useful signal takes place.

As a result of the combination of directly adjacent channels in the arrangement in accordance with the invention there will be an optimum use of the available frequency band. The cost of the ensuing circuit components of the transmitter coupler, for converting the signals to the output frequency and for power gain, is reduced by the baseband-multiplex factor M as a consequence of the combination of the output signal from each transmitter in the pre-group phase. The cost of the second coupling stage for the frequently conversion of the pre-group phase to the group-phase can be reduced by the multiplex factor M. A dynamic channel assignment can be utilized when combining the output signals of the transmitters in the pre-group phase. The transmitter coupler can be manufactured with monolithically integrated components resulting in a considerable cost reduction.

A second arrangement according to the invention has the advantage of a dynamic channel assignment feature and a reduction of the power gain by the baseband-multiplex factor M.

Preferred embodiments of the invention of the arrangement in accordance with the invention are indicated in the further Patent claims.

The circuit arrangement for making the device for the first stage of the transmitter coupler requires little circuit complexity and can be integrated.

BRIEF DESCRIPTION OF THE DRAWING

The invention will be described in further detail and explained hereinafter with reference to the embodiments of the invention shown in the drawing in which.

DESCRIPTION OF THE PREFERRED EMBODIMENTS

Figure 1:
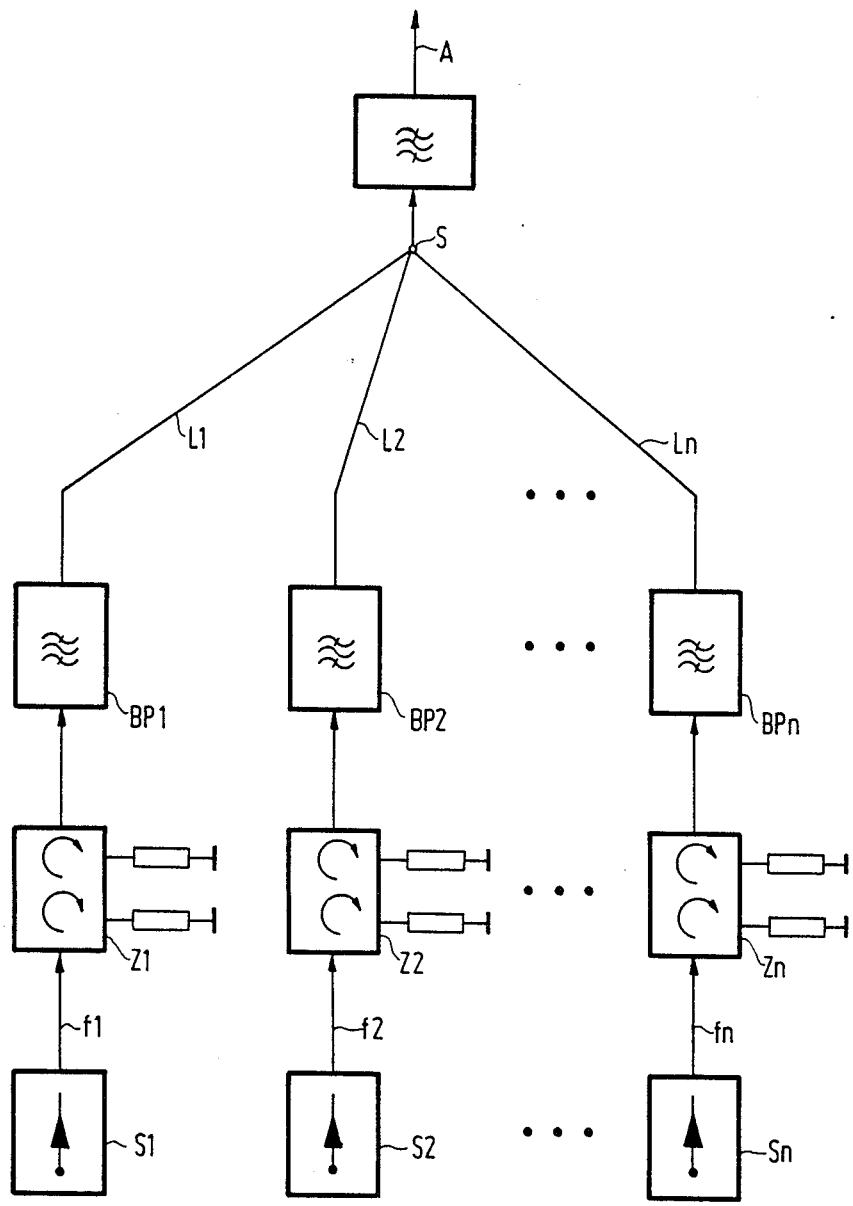
FIG. 1 shows an embodiment of the invention of a known transmitter coupler.

FIG. 1 shows an embodiment of the invention of a known transmitter coupler. In order to couple a plurality of transmitters $S1, \ldots, Sn$ operating with different carrier frequencies to an aerial A, multiplexing takes place by means of band-pass filters $BP1, \ldots, BPn$. The band-pass filters $BP1, \ldots, BPn$ have one end consisting of lines $L1, \ldots, Ln$ connected to a star network S, which leads to aerial A via transmission lines, and the other end to the transmitters $S1, \ldots, Sn$ via circulators $Z1, \ldots, Zn$. If double circulators are used the return loss lies at approximately 50 dB. For each transmitter frequency f1 to fn one circulator and one band-pass filter are arranged in each branch. The frequencies f1 to fn situated in the output frequency band cannot be transferred mutually uneffected to aerial A until (fi - fj) meets the requirements of the minimal frequency spacing.

Figure 2:
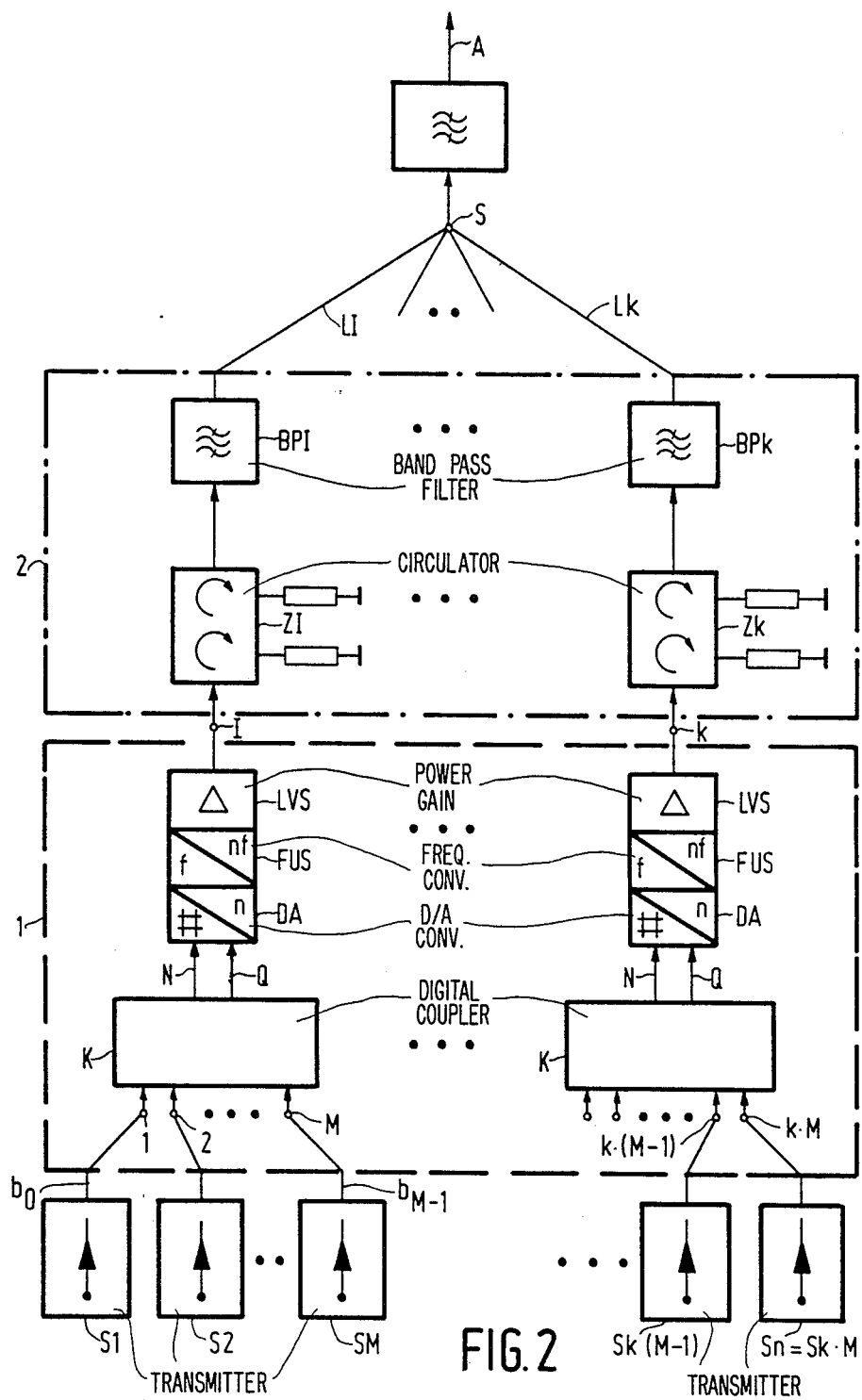
FIG. 2 shows the structure of the transmitter coupler in accordance with the invention.

In the arrangement in accordance with the invention the output signals of transmitter $S1, \ldots, Sn$ are combined by digital signal processing. FIG. 2 shows the structure of the transmitter coupler in accordance with the invention designed as a two-stage coupler. The output signals (source signals) $b_0, \ldots b_{M-1}$ of the sources or transmitters $S1, \ldots, SM$, respectively, are combined by a digital coupler K in a pre-group phase. The output signals of the parallel arranged digital couplers K are each time fed to a circulator $ZI, ZII, \ldots, Zk$ ($k=n/M$), where n is the number of inputs without a digital coupler K of the first stage) subsequent to the digital-to-analog conversion (by means of DA), frequency conversion in the group phase (by means of FUS) and power gain (by means of LVS). The signal produced by digital signal processing by means of the digital coupler K is available at its output in normal and quadrature components (N, Q). These signals can be used for the direct frequency conversion to the output frequency, that is to say the group phase, or for conversion to an intermediate frequency with a subsequent frequency conversion to the output frequency and subsequent band-pass filtering. Depending on the smaller number of inputs of the second stage, the requirements made on this second stage can be diminished considerably.

The second stage of the digital transmitter coupler can preferably be dimensioned such that the available frequency band is completely utilized to its full extent. Compared with the known transmitter couplers (cf DE-PS 28 44 776) which combine analog signals there is the possibility of fabricating the second stage with a smaller insertion loss due to the larger frequency spacing of the applied signals. Both the requirements on the power gain of the useful signals and the total power dissipation of the transmitter coupler are diminished. Depending on the baseband multiplex factor M the band-pass filters $BPI, BPII, \ldots BPk$ can be designed to have a single or a double circuit, in order to guarantee a constant insertion loss in the available frequency band.

A dynamic channel assignment within the first stage of the transmitter coupler (digital/coupler K) does not require a manual adjustment of the band-pass filters $BPI, BPII, \ldots, Bk$ in the second coupler stage. Consequently, the second coupler stage does not have to meet stricter requirements made on the frequency spacing.

Intermodulation products produced by the power amplifier stage LVS appear (when attenuated adequately) on all radio transmission channels, which can be used in the stationary radio station for the transmission of information, and are also radiated by the aerial A. By dimensioning the output stages accordingly whilst utilizing very linear amplifiers, the levels of the intermodulation products can be reduced. In order to keep the number of generated intermodulation products small as well as the frequency range, in which are situated the intermodulation products of the third order having a high level, the baseband multiplex factor M is preferably chosen between $M=4, \ldots, 8$. If one of the power amplifier stages LVS fails during operation, only 4 to 8 radio transmission channels of the radio station will be involved in this failure.

Figure 3A:
FIG. 3a and 3b show the spectral arrangements for digital signal processing in the digital coupler implementing the GTFM method.
Figure 3B:
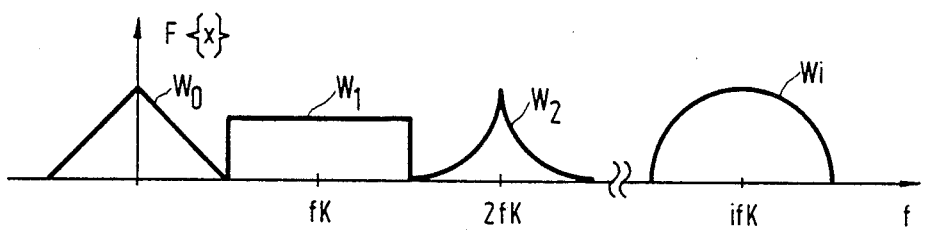

The arrangement in accordance with the invention of the digital signal processing in the digital coupler K will be further described and explained hereinafter by utilizing the GTFM (Generalised Tamed Frequency Modulation) as known from DE-AS 28 38 984. In the digital coupler K are generated GTFM baseband signals Wi having the bandwidth fk=25 kHz, which are shifted in a pre-group phase and combined additive superpositioning (frequency-division multiplexing). FIG. 3a shows by way of a diagram the spectrums of the individual GTFM baseband signals Wi, shifted and superposed in their respective pre-group phase by quadrature modulation and single sideband modulation, respectively (cf. FIG. 3b).

Consequently, the multiplex signal x(k) generated by digital signal processing additively consists of the components xi(k) according to the following equation:

$$x(k) = \sum_{i=0}^{M-1} xi(k) \quad (1)$$

In this equation k denotes a time index (sampling point) M the baseband-multiplex factor and i the index of the respective radio transmission channel.

Figure 4:
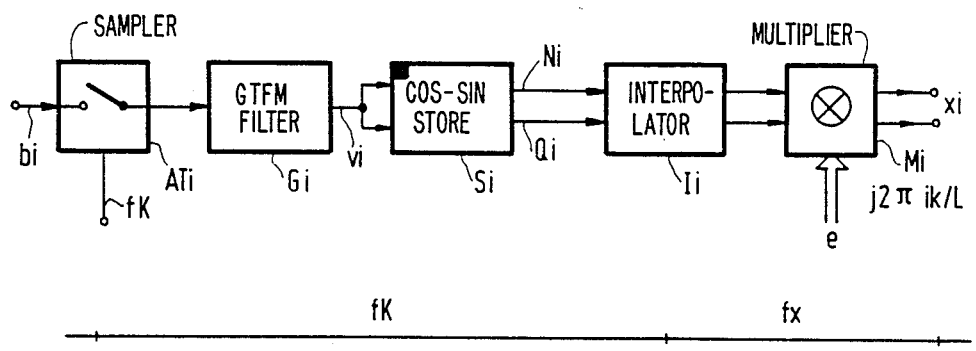
FIG. 4 shows an embodiment of the invention of combining the output signals of each transmitter in the pregroup phase by implementing the GTFM method.

With reference to FIG. 4 is further described and explained hereinafter the generation of the components xi of the i-th radio transmission channel (according to the GTFM known from DE-AS 28 38 984). The output signals $b_i$ of the transmitter Si are applied to a sampler ATi operating with a first sampling frequency fK. The sampler ATi is connected to a GTFM filter Gi.

The source signal bi of the i-th radio transmission channel has, for example, a bitrate of fb=19 kbit/s and the channel spacing in the multiplex signal is chosen to be for example fK=25 kHz according to the bandwidth of the GTFM spectrum. Subsequently, the complex GTFM baseband signal Wi is generated, whose spectrum is shown in FIG. 3a. The GTFM baseband signal Wi can be represented in normal and quadrature components in accordance with the equation:

$$Wi = Ni + j \times Qi \quad (2)$$

According t sampling theorem the GTFM baseband signal Wi can be sampled with the sampling frequency fK. In order to reduce the cost of the circuit arrangement, the source signal $b_i$ is, subsequently, sampled with the sampling frequency fK and a GTFM baseband signal Wi is generated in a way and manner described in DE-AS 28 38 984. The output signal $b_i$ sampled with the sampling frequency fK is filtered digitally by means of GTFM filter Gi, connected to a Cos-Sin store Si. The output signal vi of the GTFM filter Gi serves as an address for the Cos-Sin store Si.

The Cos-Sin store Si is connected to an interpolator Ii. On account of the larger bandwidth of the multiplex signal x(k) the spectral shift of the GTFM baseband signal Wi in the pre-group phase requires an interpolation, which means an increase of the sampling frequency fK to f=L×fK by digital interpolation filtering. The digital interpolation filtering utilizing the second sampling frequency fx increased by the factor L is carried out separately for normal and quadrature components Ni, Qi of the GTFM baseband signal Wi.

The interpolator Ii is connected to a multiplier Mi, which multiplicatively combines the filtered normal and quadrature components Ni, Qi with a Cos- and Sin-oscillation, respectively, leading to the component xi in the pre-group phase. This process corresponds with a complex quadrature modulation. In the embodiment of the invention of the digital coupler K shown in FIG. 4 each radio transmission channel requires one interpolation filter Ii.

Figure 5:
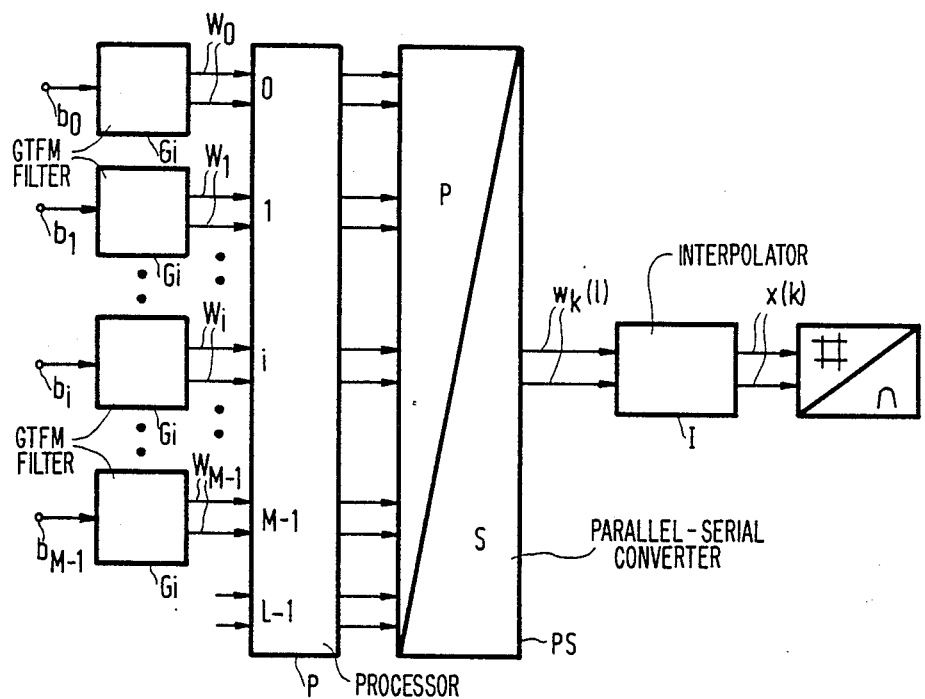
FIG. 5 shows a further embodiment of the invention of multiplexing in the first stage whilst utilizing not more than one interpolator.

In the embodiment of the invention shown in FIG. 5 the interpolation is carried out simultaneously for M≦L radio transmission channels having a common filter I. The output signals $b_0, \ldots, b_{M-1}$ from m transmitters S1, ..., SM are each applied to a GTFM filter Gi. The GTFM filters Gi are connected to a processor P for constituting an inverse discrete Fourier transform. The output signals of the processor P are applied to a parallel-serial converter PS, connected to an interpolator I for filtering its output signal by way of interpolation.

With the impulse response H(k) of the interpolator I the component x(k) according to the equation (3) is:

$$x(k) = \sum_{i=0}^{M-1} \sum_{1} h(k - 1 \times L) \times Wi(1 \times L) \times e^{j\frac{2\pi}{L} \times i \times k} \quad (3)$$

The first sum term denotes the superpositioning of M complex band-pass signals xi. The second sum term denotes the effected filtering by using modulation, Aa the impulse response h(k) is independent of channel index i, the order of the summation in equation (3) can be changed. For the complex exponential function the perodicity holds according to equation (4)

$$e^{j\frac{2\pi}{L} \times i(k0+L)} = e^{j\frac{2\pi}{L} \times i \times k0} \quad (4)$$

With regard to equation (4) equation (3) can be transformed. Thus:

$$x(k) = \sum_{1} h(k - 1 \times L) \times \sum_{i=0}^{M-1} Wi(1 \times L) \times e^{j\frac{2\pi}{L} \times i \times [k] modL} \quad (5)$$

The second sum term can be interpreted as an inverse discrete Fourier transform (IDFT) of the order of Wi (lxL), for i=0, 1, ...,L-1, whilst the channels i=, ..., L-1 are not busy.

On account of the periodicity of the exponential function as against time of sampling point k it will be sufficient to carry out one transform for each sampling point, that is to say to make a calculation with the lower sampling frequency fK only. The actual increase of the sampling frequency will take place by subsequent interpolation filtering of the result of the transform. The equation (6) holds that:

$$w_k(1 \times L) = \sum_{i=0}^{M-1} Wi(1 \times L) \times e^{j\frac{2\pi}{L} \times i \times [k] modL} \quad (6)$$

When inserting equation (6) in equation (5) the component x(k) will be:

$$x(k) = \sum_{1} h(k - 1 \times L) \times w_k(1 \times L) \quad (7)$$

In comparison with the embodiment of the invention in accordance with FIG. 4 the embodiment of the invention of the digital coupler K according to FIG. 5 has the advantages, that only a single interpolator I is required instead of the otherwise required number of M available interpolators Ii and that by simple product summation with few terms a simultaneous quadrature modulation can be realised.

Figure 6:
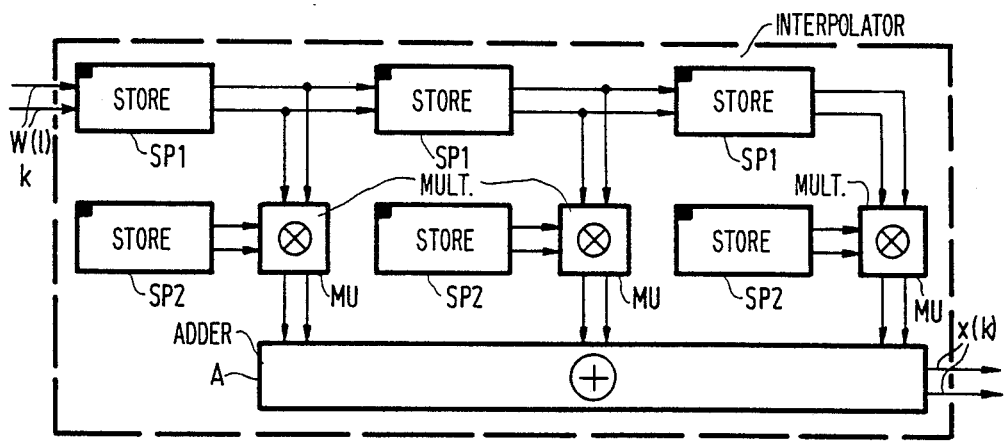
FIG. 6 shows an embodiment of the invention of a periodic time-variable interpolator for the embodiment according to FIG. 5.

FIG. 6 shows an embodiment of the invention of a periodic time-variable interpolator. A non-recursive filter having two-channel delay networks is utilized as interpolator I. The interpolator I has a number of p stores SP1 having the length L for storing the last p values of the transform and a number of p stores SP2. having the length L for storing the impulse response. The interpolator I further includes a number of p two-channel multipliers MU for forming the products of the values of the transform and values of the impulse response. The two-channel multipliers MU are connected to an adder A having a number of 2p inputs, which adder adds up the product terms divided into normal and quadrature components $N(k)$, $Q(k)$.

The impulse response $h(k)$ having the length $p \times L$ is written in the interpolator I into the p two-channel delay networks having the length L for accommodating the values $w_k(1 \times L)$, where $k = 1 \times L, \ldots, (1+1) \times L - 1$ for thelast transforms. The $p \times L$ filter coefficients are filed in the stores SP2 each having L registers. For a calculation of the sampling values of the normal and quadrature components $N(k)$, $Q(k)$ of the multiplex signal $x(k)$ only p multiplications and additions are required for each sampling. In view of a proper selection of an adjacent channel, values preferably ranging from 3 to 8 are chosen for p.

Because it is a matter of values having the complex exponential function when dealing with the values $Wi(1 \times L)$, the sum terms can be transformed in accordance with the equation (6).

$$Wi(1 \times L) \times e^{j\frac{2\pi}{L} i \times k} = e^{j(vi + \frac{2\pi}{L} i \times k)} \qquad (8)$$

Figure 7:
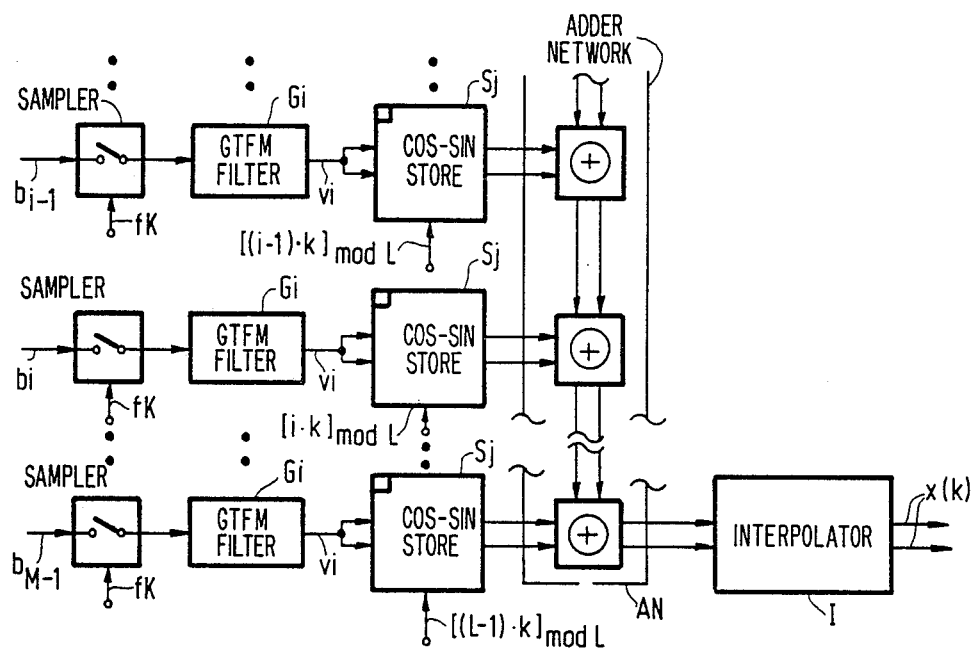
FIG. 7 shows a further embodiment of the invention of digital signal processing in the first stage without DFT and having enlarged Cos-Sin-stores and FIG. 8 shows a further embodiment of the invention of the signal processing in the digital coupler whilst utilizing additive address increments.

The product is unequivocally determined by the output value vi of the GTFM filter Gi as well as the time index k and the channel index i (by $i \times k)_{modL}$, respectively. Therefore, in the embodiment of the invention shown in FIG. 7 the actual product formation is dispensed with and an enlarged Cos-Sin-store Sj is connected to the GTFM filters Gi.

The information vi changes with a lower clock fb, whilst the index addresses are changed with the higher clock frequency fK. Under the valid addresses are the values:

$$\cos\left(vi + \frac{2\pi}{L} i \times k\right) \text{ and } \sin\left(vi + \frac{2\pi}{L} i \times k\right).$$

These values are also read out from the Cos-Sin-store Sj and applied to an adder network AN and added there. The interpolator I is connected to the adder network AN.

Figure 8:
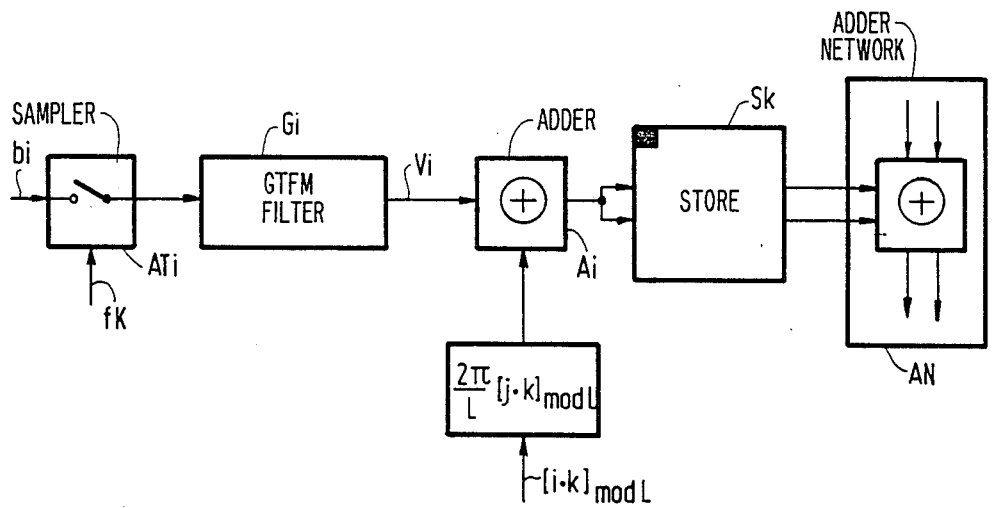

In a further embodiment of the invention shown in FIG. 8 an adder Ai is connected to each GTFM filter Gi. In adder Ai the sum is formed from the respective increment $(2\pi/L) \times i \times k$ according to equation (8) and argument vi. A store Sk connected to each adder A is directly addressed with this sum. Consequently, in comparison with the embodiment of the invention shown in FIG. 7 an increase of the number of address inputs of the store Sk can be dispensed with. The increments themselves required for the addition can be filed in further stores. All in all only a maximum number of L different increments can be made available on account of the periodicity of the exponential function.

What is claimed is:

1. An arrangement for coupling a plurality of transmitters to a common aerial comprising:
   a first plurality of n transmitters, where $n = K \times M$ for providing separate source output signals;
   digital signal processing means comprising a second plurality of k digital couplers, each having input terminals for accepting a number M of said separate output signals and for combining said M separate output signals into a combined digital signal output, said digital signal processing means further comprising the combination of a digital to analog converter and a frequency converter coupled to each said digital coupler for producing k modulated output signal having a different carrier frequency;
   a plurality of k circulators coupled to respective ones of said digital signal couplers; and
   a plurality of k band pass filters connected between said circulators and said aerial for coupling said modulated carrier output signals to said aerial.

2. An arrangement as claimed in claim 1 wherein base band signals are generated in each said digital coupler from said source signals and said base band signals are sifted each time and, subsequently, additively superposed on each other.

3. An arrangement as claimed in claim 2, wherein in the digital coupler GTFM base-band signals are generated and complex quadrature modulation is carried out to shift the GTFM baseband signals.

4. An arrangement as claimed in claim 2, wherein in the digital coupler GMSK baseband signals are generated and a complex quadrature modulation is carried out to shift the GMSK baseband signals.

5. An arrangement as claimed in any one of claims 1 and 3, wherein said source signals are each applied to a sampler operating with a first sampling frequency Fk and connected to a GTFM filter, said GTFM filter is connected to a Cos-Sin-store, an output signal of the GTFM signal serving as an address, said Cos-Sin-store is connected to an interpolator effecting a digital interpolation filtering utilizing a second sampling frequency $Fx = L \times Fk$ for separate normal and quadrature components of the GTFM baseband signal, and the interpolator is connected to a multiplier each time combining the filtered normal and quadrature components to an exponential function causing a component to be developed.

6. A circuit arrangement as claimed in any one of claims 1 and 3, wherein said source signals are each time applied to a respective GTFM filter Gi, where $i = 1 \ldots M$, and, for constituting an inverse discrete Fourier transform the GTFM filters are connected to a processor, the output signals of the processor are applied to a parallel serial converter, which for the interpolation filtering of its output signals is connected to an interpolator.

7. A circuit arrangement as claimed in claim 6, wherein a non-recursive filter having two channel delay networks is situated as an interpolator, which filter has a first plurality of p stores, each having L registers, for storing the last p values of the transform, and has a second plurality of p stores, each having L registers, for storing the impulse response of the interpolator, the interpolator includes p two-channel multiplexers for forming the product of values of the transform and values of the impulse response and the two-channel multiplexers are connected to an adder having 2p inputs, for adding the product terms for normal and quadrature components separately.

8. A circuit arrangement as claimed in claim 6, wherein an enlarged Cos-Sin-store is connected to each GTFM filter which store is addressed to modL by the output signal of the GTFM filter and by the product of (i-1) and k, whilst under the valid addresses the values $\cos(vi + 2\pi/L \, i \times k)$ and $\sin(vi + 2\pi/L \, i \times k)$ are found and the values read from the Cos-Sin-store are applied to an adder network and added there, this network being connected to the interpolator.

9. A circuit arrangement as claimed in claim 6, wherein an adder is connected to each GTFM filter, which adder directly addresses a store by means of the sum of vi and modl formed before.

* * * * *

UNITED STATES PATENT AND TRADEMARK OFFICE
CERTIFICATE OF CORRECTION

PATENT NO. : 4,868,810

DATED : September 19, 1989

INVENTOR(S) : Peter Vary and Ulrich Wellens

It is certified that error appears in the above-identified patent and that said Letters Patent is hereby corrected as shown below:

Column 8, line 22, after "lated" insert --carrier output signals in parallel, each said modulated carrier--;

line 44, change "Fk" to --fK--;

line 50, change "Fx=LXFk" to --fx=LxfK--;

line 66, change "situated" to --utilized--;

Column 9, line 7, change "multiplexers" to --multipliers--.

Signed and Sealed this

Twenty-ninth Day of October, 1991

Attest:

HARRY F. MANBECK, JR.

*Attesting Officer*  *Commissioner of Patents and Trademarks*